J. W. ASHWORTH.
ELEVATING ATTACHMENT.
APPLICATION FILED SEPT. 5, 1907.
1,023,981.
Patented Apr. 23, 1912.
2 SHEETS—SHEET 1.
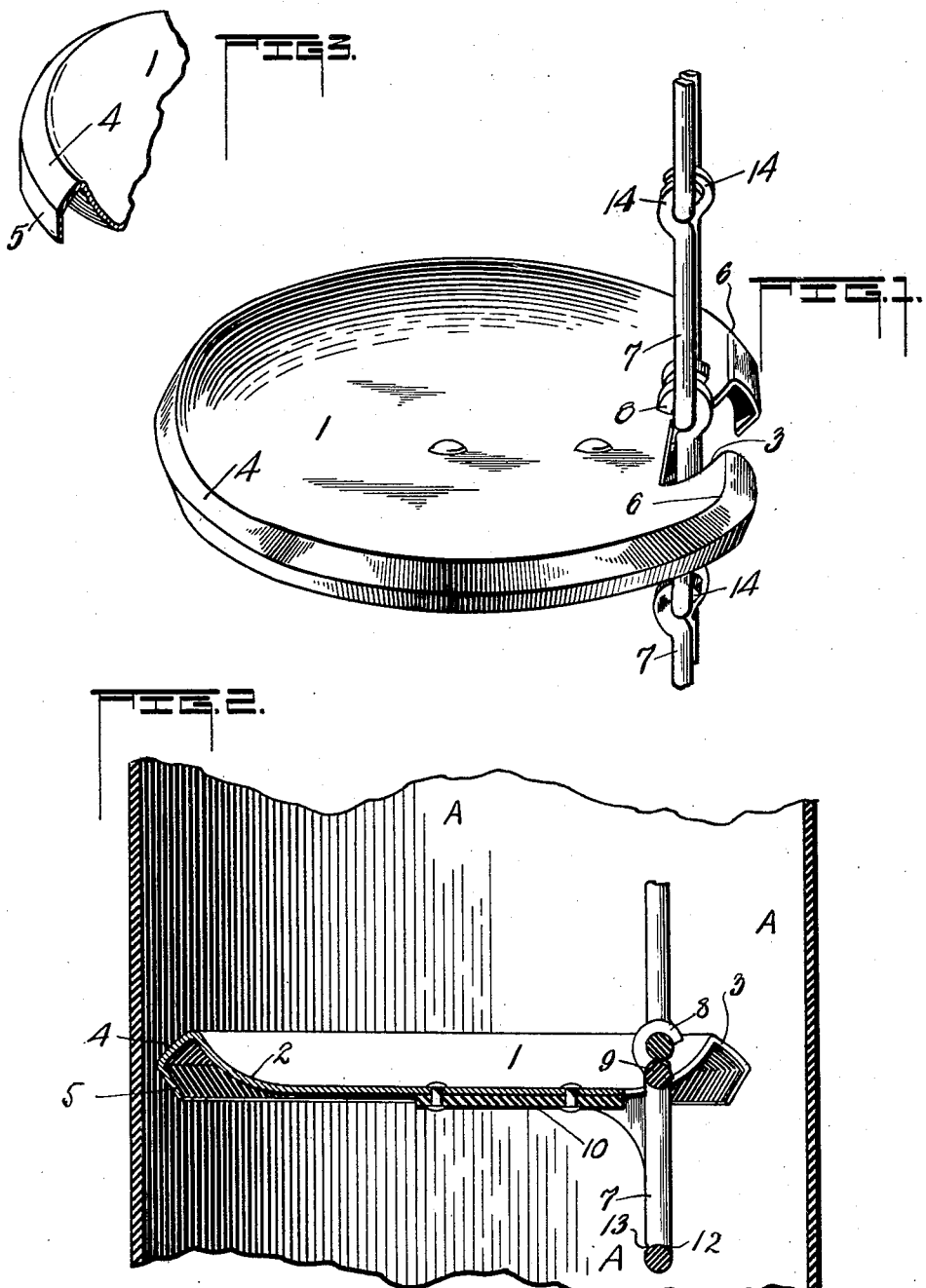

J. W. ASHWORTH.
ELEVATING ATTACHMENT.
APPLICATION FILED SEPT. 5, 1907.
1,023,981.
Patented Apr. 23, 1912.
2 SHEETS—SHEET 2.
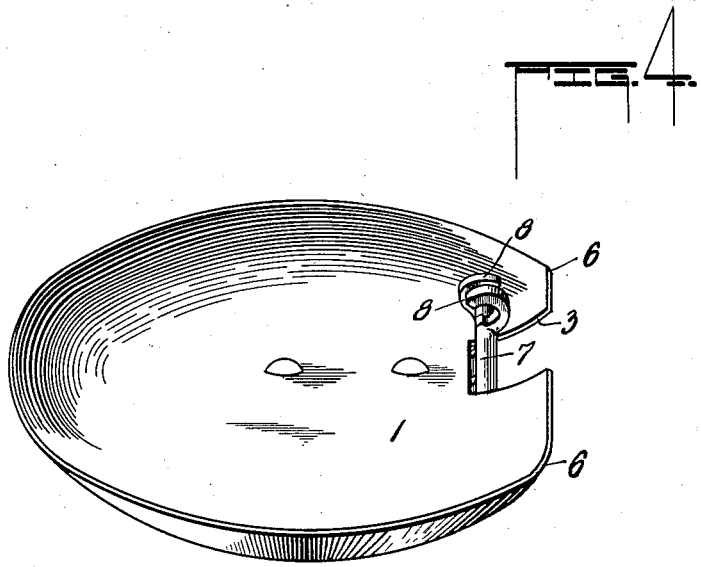
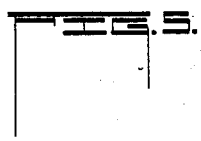
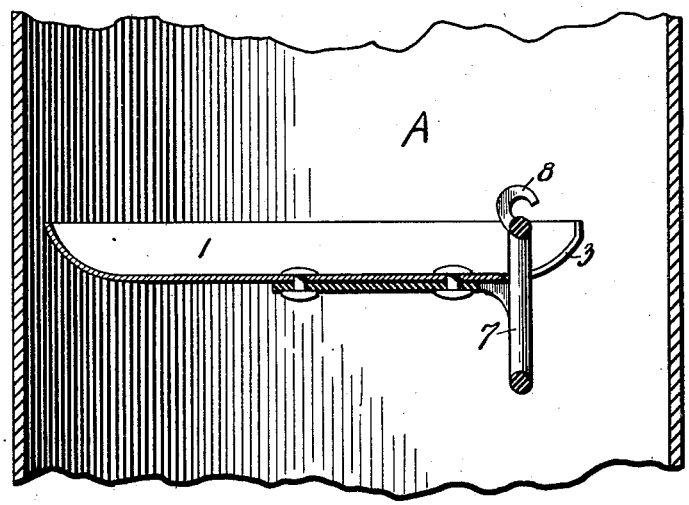
Witnesses:
Miles C. Fuller
Laura E. Claypool.
Inventor
John W. Ashworth
By Chas. W. LaPorte
Atty
COLUMBIA PLANOGRAPH CO., WASHINGTON, D. C.

UNITED STATES PATENT OFFICE.

JOHN W. ASHWORTH, OF PEORIA, ILLINOIS.

ELEVATING ATTACHMENT.

1,023,981.　　　　Specification of Letters Patent.　　Patented Apr. 23, 1912.

Application filed September 5, 1907. Serial No. 391,409.

*To all whom it may concern:*

Be it known that I, JOHN W. ASHWORTH, a citizen of the United States, residing at Peoria, in the county of Peoria and State of Illinois, have invented certain new and useful Improvements in Elevating Attachments; and I do hereby declare that the following is a full, clear, and exact description of the invention, which will enable others skilled in the art to which it appertains to make and use the same.

This invention has reference to certain new and useful improvements in conveyer or elevator flights, pans, cups, buckets, or containers and chains with which said flights may be connected.

One of the objects of the present invention is a saucer shaped flight, pan and the like, as stated, which is pressed into form from a single piece of sheet metal to provide the same with a dished central portion and a portion thereof cut away to provide for connecting a chain thereto.

A further object of the present invention is a flight, which is pressed into form from a single piece of sheet metal to provide the same with a dished central portion and its edge beveled outwardly and downwardly and then inwardly and downwardly.

The invention has for its further object, a flight which is approximately circular in outline, having a dished body portion surrounded by an upturned edge, and a portion of said flight cut away to provide for the connection of a chain therewith; the edge of the flight adjacent to and upon opposite sides of said cut out portion turned abruptly toward such cut out portion.

The invention has for its further object, a flight which is approximately circular in outline, having a dished body portion surrounded by an oppositely beveled edge, and a portion of said flight cut away to provide for the connection of a chain therewith.

A further object of the invention is a flight or pan including as a part thereof a section of the conveyer chain capable of being detached from the body of the chain and provided with a pair of oppositely disposed and spaced linking hooks, making it necessary when connecting adjacent links, to slip a portion of one link into one of said hooks and then throwing the link into an opposite position to adapt it to be connected with the other of said hooks.

For a further and full description of the invention herein and the merits thereof, and also to acquire a knowledge of the details of construction of the means for effecting the result, reference is had to the following description and drawings hereto attached.

While the essential and characteristic features of the invention are susceptible of modification, still the preferred embodiment of the invention is illustrated in the accompanying drawings, in which:—

Figure 1 is a perspective view approximately full size of one form of my improved flight, and a portion of the chain to which the same may be attached; Fig. 2 is a vertical longitudinal section taken through a portion of a circular elevator tube and the flight and chain shown in Fig. 1 in cross-section within said tube; Fig. 3 is a perspective view of a portion of a flight, such as shown in Fig. 1, showing the first steps in the operation of pressing the flight into shape and forming therein, the depression and the reinforced edge thereof. Fig. 4 is a perspective view approximately full size of one other form of flight, being the same as Fig. 1, with the exception of the oppositely beveled edge; Fig. 5 is a vertical longitudinal section taken through a portion of an elevator tube and the flight shown in Fig. 4, in cross-section within said tube.

Like numerals indicate corresponding parts throughout the figures.

The flight which has been illustrated in the drawings and which will be hereinafter more fully described in detail, has been designed particularly for use in connection with elevators, preferably of the double tube type, of grain weighing machines, and also in connection with a similar type of elevator, known as portable elevators and employed for elevating, preferably small grain or other suitable material which is received from a wagon or for that matter, from any other receptacle and delivers the same to a car, bin, housing or store-house for receiving the same; and such flight or flights are intended to take the place of the ordinary disk flights which are used in elevators, preferably of the type above referred to.

Disk flights, which are more or less in general use in elevators of one kind and another, but more particularly found in the double tube type, are usually made considerably less in diameter than the tubes through which they pass, for two reasons: One is that there are more or less projections in the tubes or head and end sections to which they are connected, as it is the practice to insert the tubes into the sections and a common connection is by bolt or by rivet, with which said flights are liable to engage, which engagement will not only bend, but at times will break the flights and also separate the chain or break the connecting portions of the links thereof or it may be that said flights are bent out of shape which will destroy their usefulness and shake the grain or other material therefrom which falls back into the tubes. The other reason is that the vibration of the tubes as well as the flights, will shake the grain or material therefrom during the progress of the flights from the receiving to the discharge end of the elevator and sufficient space must be left between the wall of the tube and the flights to allow the grain or other material falling or being discharged therefrom, to fall back into the tube and so much thereof as possible to be picked up by the succeeding flights and conveyed to the discharge end of the elevator. Such disadvantages of the ordinary disk flights, as will become apparent, I overcome, by the use of my improved flight.

My improvement in flights is also intended to overcome one of the serious objections in the use of disk flights in connection with elevators of grain weighing machines. It is a common custom in such machines to speed the elevators very fast, owing to the small carrying capacity of the disk flights, which necessitates a very rapid action of the grain weighing machine and a rapid rise and fall of the scale beam thereof, which does not permit the weighing devices weighing as accurately, as would be the case where there was no such necessity for operating the elevator so fast, or not causing such a rapid rise and fall of the scale beam. Owing to my being able to employ a flight more in keeping with the diameter of the tubes through which it passes and in retaining whatever grain or material is picked up thereby, I can deliver just as much material, as is the practice with elevators with disk flights, and not speed the elevator nearly so fast and the weighing devices owing to a more uniform action will weigh more accurately.

In the drawing, for convenience, I have shown a section of a portion of one of the circular tubes of an elevator of either of the types referred to which I have indicated as A, for the purpose of illustrating the use of my improved flight and chain in connection therewith.

The flight I have referred to generally as 1, which in its crude state, may be a flat piece of any suitable gage of sheet metal which by any suitable pressing or stamping process, is pressed into either of the forms shown in Figs. 1, 2, 4 and 5. The first step of such a process, would be to simultaneously form a depression 2 in the body of the sheet, and cut out a portion thereof as at 3, for a purpose to be described, and if desired bend in said sheet around the outer edge thereof, the downwardly and outwardly beveled portion 4 which terminates in the vertical flange 5 which depends therefrom, and then by the use of any suitable mechanism, such as beading rolls, said flange 5 is turned inwardly toward the body of the plate, as best seen in Fig. 2. So that when a complete operation has been formed for producing a flight from a piece of sheet metal, the body of said flight, is shown provided with a central dished portion, having the outwardly and downwardly and inwardly and downwardly beveled portions and said flight has an approximately circular outline, except at points 6, the same being true in the constructions shown in Figs. 1 and 4, where the outline is a little irregular or an abrupt bend is made, which is for the purpose of accommodating said flights to the turn at the upper and lower ends of the elevator. Forming in the flight a depression which produces a saucer shaped flight, said flight as it passes through the receiving end of the elevator, will receive or pick up a given amount of grain or other material and as it passes through the elevator to the discharge end thereof, the vibration of the tubes or of the flights will in no way disturb or shake therefrom the grain or other material carried thereby; so that as a flight travels from a receiving to a discharge end of an elevator, it will retain what is received and deliver it to the discharge end of said elevator. Beveling the edge of the flight in opposite directions, will enable the said flight to very easily pass any obstructions with which it might engage in its passage through the elevator tubes or head and end sections, because where any such engagement might take place, the beveled edges of the flights will enable them to ride past the obstructions and such flights may have lateral motion without being bent out of shape or parts thereof being broken away in transit. Beveling the edge of the flights in opposite directions as shown, serves a further purpose and that is, when it is necessary to slightly reverse the operation of the flights in the elevator, the bevel edge thereof, will enable them to pass by any obstructions, such as the edges of the end sections or other projections, in the manner just explained without bending said flights out of shape, breaking parts therefrom or retarding their movement through the tubes or sections connected with the same. There is a further advantage of beveling the edge of a flight of this character, which serves as a reinforcing means therefor, and should the flights get caught in any manner where it might cause the bending or breaking thereof, said reinforced edge will prevent any bending or breakage thereof.

The flights shown in Figs. 4 and 5, while similar to the flight shown in Figs. 1 and 2, with the exception of the oppositely beveled edge, are just as useful and will carry just as much grain or other material as the flight shown in Figs. 1 and 2, and if made small enough in diameter will pass obstructions in the tubes and head and end sections as easily as those with beveled edges. However, where some suitable sheet metal joining is used for uniting the tubes, end sections or the tubes to the end sections, so that the heads of the bolts are countersunk, and where said tubes are joined in the end sections by being swaged therein, or the end sections off-set to do away with the projecting ends of the tubes, the flights shown in Figs. 4 and 5, may be of good size and there be no danger of the flights engaging with projections such as referred to.

The chain to which reference has been made and to which flights of Figs. 1 and 4 may be attached at intervals throughout the length thereof, consists of a series of links which I have referred to as 7 and which have a detachable connection with each other. The main body of these links is of substantially the same construction as the well-known and commonly used detachable chain links and the manner of connecting the said links is a good deal similar to the manner of connecting the well-known detachable chain links, with the exception, that in the provision made for the connection of adjacent links it is necessary to throw the links in reverse positions before they can be securely locked together. To attach the flights which I have described to a chain composed of the links herein referred to, certain of said links are provided with an attachment indicated as 10, which is riveted to the flights, in the manner shown in Figs. 1 and 2, or otherwise suitably connected thereto. To connect a pair of links and to allow for sliding one end of one link into engagement with the linking hooks of the opposite link, each link at its end opposite to that end provided with the hooks, is provided with indentations or notches 12 on one side and on the reverse side, similar indentations or notches 13.

Having thus fully described my invention what I claim and desire to secure by Letters Patent of the United States, is:—

1. In a conveyer of the class described and including a pan and chain, a pan having in its edge a cut-away portion and a section of said chain secured in said portion, said section having coupling ends adapted to engage any link in said chain.

2. A flight for conveyers, being substantially saucer shaped with a depressed central portion and a portion thereof cut-out inwardly from the edge of said flight, said edge having abrupt turns upon opposite sides of the cut-out portion and in proximity thereto.

3. The combination with a conveyer-chain, of a flight approximately circular in outline provided with a central dished portion and its edge beveled downwardly and then inwardly.

4. A saucer shaped flight having its edge beveled and a portion of said edge cut out, and a link secured to said flight and projecting through the cut-out portion thereof.

5. As an article of manufacture, a flight pressed into form from a single piece of sheet metal, having a depressed body portion, and its edge partly cut away and beveled downwardly and inwardly.

6. A flight made from a single piece of sheet metal and approximately circular in outline, its body depressed and a portion thereof cut away from the edge inwardly, the edge of said flight being beveled and upon opposite sides of the cut-out portion having an abrupt turn.

In testimony whereof I affix my signature, in presence of two witnesses.

JOHN W. ASHWORTH.

Witnesses:
   Chas. W. La Porte,
   Laura E. Claypool.

---

Copies of this patent may be obtained for five cents each, by addressing the "Commissioner of Patents, Washington, D. C."